(12) United States Patent
Graf

(10) Patent No.: US 9,322,423 B2
(45) Date of Patent: *Apr. 26, 2016

(54) MAGNETOINDUCTIVE FLOW MEASURING DEVICE INCLUDING CORE SHEETS BOLTED TOGETHER WITHIN AN INSULATING BOLT SLEEVE

(75) Inventor: Oliver Graf, Kanerkinden (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 95 days.

This patent is subject to a terminal disclaimer.

(21) Appl. No.: 14/347,005

(22) PCT Filed: Aug. 16, 2012

(86) PCT No.: PCT/EP2012/066042
§ 371 (c)(1),
(2), (4) Date: Mar. 25, 2014

(87) PCT Pub. No.: WO2013/045172
PCT Pub. Date: Apr. 4, 2013

(65) Prior Publication Data
US 2014/0230566 A1 Aug. 21, 2014

(30) Foreign Application Priority Data
Sep. 27, 2011 (DE) .......................... 10 2011 083 550

(51) Int. Cl.
G01F 1/58 (2006.01)
F16B 29/00 (2006.01)
F16B 19/02 (2006.01)
F16B 5/02 (2006.01)

(52) U.S. Cl.
CPC ................. *F16B 29/00* (2013.01); *F16B 5/025* (2013.01); *F16B 5/0258* (2013.01); *F16B 19/02* (2013.01); *G01F 1/58* (2013.01); *G01F 1/582* (2013.01)

(58) Field of Classification Search
None
See application file for complete search history.

(56) References Cited

U.S. PATENT DOCUMENTS

| 1,905,790 | A |   | 4/1933  | Brand |
|-----------|---|---|---------|-------|
| 2,277,443 | A | * | 3/1942  | Livingston ............. H01H 50/56 411/544 |
| 2,844,568 | A |   | 10/1955 | Mertz |
| 2,743,334 | A | * | 4/1956  | Valenti ..................... G01K 5/62 337/372 |
| 4,050,771 | A | * | 9/1977  | Watson .................... H01R 9/18 411/10 |
| 4,137,766 | A | * | 2/1979  | Handel ................... G01P 5/086 73/861.11 |
| 4,631,433 | A | * | 12/1986 | Stokes ..................... H02K 5/15 411/531 |
| 4,906,148 | A | * | 3/1990  | Schule .................. E04D 3/3603 411/34 |

(Continued)

FOREIGN PATENT DOCUMENTS

| CN | 1294662 A   | 5/2001 |
| CN | 101702353 A | 5/2010 |

(Continued)

OTHER PUBLICATIONS

Apr. 10, 2014 English Translation of IPR, WIPO, Geneva, Switzerland.

(Continued)

*Primary Examiner* — Harshad R Patel
(74) *Attorney, Agent, or Firm* — Bacon & Thomas, PLLC

(57) ABSTRACT

A bolt sleeve for insulating a bolt or machine screw, wherein the bolt sleeve is so embodied that it axially shortens by a predetermined amount in the case of a force of predetermined size acting axially on it, whereupon the bolt sleeve assumes at least partially the shape of a bellows.

8 Claims, 3 Drawing Sheets

(56) References Cited

U.S. PATENT DOCUMENTS

| | | | |
|---|---|---|---|
| 5,054,983 A | 10/1991 | Froewis et al. | |
| 5,195,378 A * | 3/1993 | Ferguson | G01N 3/10 73/790 |
| 5,275,519 A * | 1/1994 | Hainke | F16B 13/06 411/34 |
| 6,402,129 B1 | 6/2002 | Tani | |
| 6,422,090 B1 * | 7/2002 | Ferguson | B21J 9/20 73/795 |
| 2006/0250031 A1 * | 11/2006 | Kim | F04B 35/045 417/417 |
| 2014/0230564 A1 * | 8/2014 | Graf | G01F 1/588 73/861.11 |
| 2014/0230565 A1 * | 8/2014 | Graf | G01F 1/586 73/861.11 |

FOREIGN PATENT DOCUMENTS

| | | |
|---|---|---|
| DE | 402536 C | 9/1924 |
| DE | 1054155 | 4/1959 |
| DE | 1513908 A1 | 4/1969 |
| DE | 3236740 A1 | 12/1984 |
| DE | 202006003150 U1 | 7/2006 |
| EP | 0189569 A1 | 6/1986 |
| EP | 0420799 A2 | 3/1991 |
| GB | 2091368 A | 7/1982 |
| JP | 58150220 | 9/1983 |
| WO | 2013045172 A1 | 4/2013 |

OTHER PUBLICATIONS

Jul. 6, 2012 German Search Report, German Patent Office, Munich.
Feb. 18, 2013 International Search Report, EPO, The Netherlands.

* cited by examiner

MAGNETOINDUCTIVE FLOW MEASURING DEVICE INCLUDING CORE SHEETS BOLTED TOGETHER WITHIN AN INSULATING BOLT SLEEVE

TECHNICAL FIELD

The present invention relates to a bolt sleeve for insulating a bolt or machine screw.

BACKGROUND DISCUSSION

Bolt sleeves for insulating bolts or machine screws are known.

SUMMARY OF THE INVENTION

An object of the invention is to provide a bolt sleeve, which is suitable for equalizing tolerances in components to be bolted together.

The object is achieved by a bolt sleeve characterized in that the bolt sleeve is so embodied that it axially shortens by a predetermined amount in the case of a force of predetermined size acting axially on it, whereupon said bolt sleeve assumes at least partially the shape of a bellows.

The invention permits numerous forms of embodiment. Some thereof will now be explained in greater detail based on the appended figures of the drawing. Equal elements are provided in the figures with equal reference characters. The figures of the drawing show as follows:

DETAILED DISCUSSION IN CONJUNCTION WITH THE DRAWINGS

Figure 1:
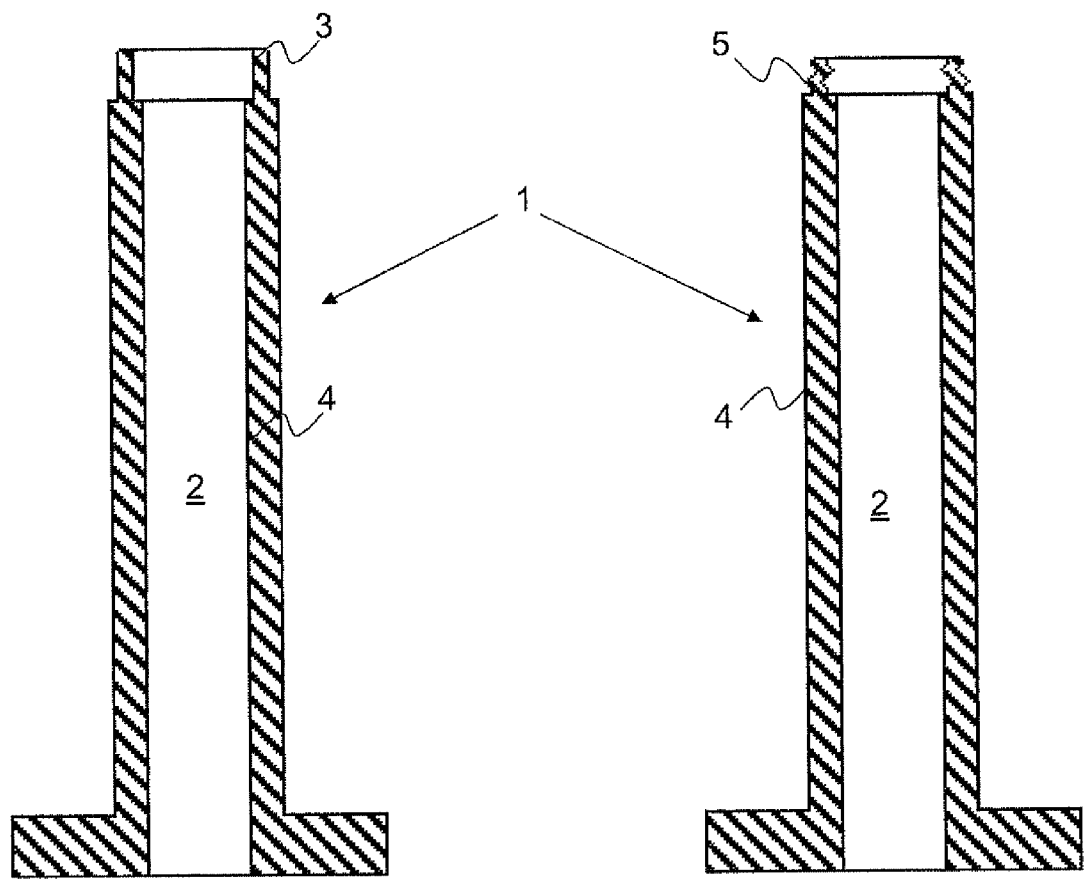
FIG. 1 is a bolt sleeve of the invention in sectional views.

FIG. 1 shows a bolt sleeve 1 of the invention for electrical and/or magnetic insulation of a bolt; the section on the left shows the state after manufacture, while the section on the right shows a region that has assumed the shape of a bellows. Bolt sleeve 1 includes a bore 2 for accommodating and guiding a bolt. The bore 2 has for guiding the bolt in a region 4 of the bolt sleeve 1 provided therefor an inner diameter constant over the length of the region 4. The inner diameter is determined by the bore 2.

Bolt sleeve 1 is so embodied according to the invention that a force of predetermined size acting axially on it axially shortens it by a predetermined amount, whereupon it assumes at least partially the shape of a bellows 5. In the illustrated example of an embodiment, the bolt sleeve 1 has at its tip a region having a lessened wall thickness, which, in the case of an axially acting force of predetermined size, assumes the shape of a bellows 5 and, thus, is axially shortened by a predetermined amount. In the illustrated example of an embodiment, the region with reduced wall thickness is a ring 3 at the tip of the bolt sleeve 1. Ring 3 has a greater inner diameter and a smaller outer diameter than the bolt sleeve 1 in a region 4 provided for guiding the bolt. Bolt sleeve 1 is, thus, not suitable for guiding the bolt in the region of the ring 3.

If the bolt sleeve 1 is supplied axially with a force, which has or exceeds a predetermined size, then ring 3 is deformed such that it assumes the shape of a bellows 5.

The length of the region with the lessened wall thickness, thus here the length of the ring 3, is, according to a form of embodiment of the invention, small in comparison with the axial length of the region 4 of the bolt sleeve 1 used for guiding the bolt.

If the bolt sleeve 1 assumes partially the shape of a bellows 5, then, according to an additional further development of the bolt sleeve of the invention, the bellows has a smaller outer diameter than the bolt sleeve 1 in a region 4 for guiding the bolt. If, for example, at least two sheet metal pieces to be bolted together with a bolt and to be insulated from the bolt are bolted together, then these sheet metal pieces are not shifted relative to one another radially to the bolt sleeve. Thus, because of the smaller outer diameter of the bellows 5, the deformation of the bolt sleeve does not lead to a force radially to the bolt sleeve on one of the sheet metal pieces.

A bolt sleeve of the invention is comprised especially of a polymer material, such as e.g. polyether sulphone. Alternative materials include, for example, polyetheretherketone or polyphenylene sulfide. The bolt sleeves are, thus, electrically and, in given cases, magnetically insulating.

Naturally, the bolt sleeves of the invention, as well as also the bolt sleeves of the state of the art, are, to a certain amount, axially elastically deformable. The amount is dependent especially on the introduced force, as well as on the material and the wall thickness of the bolt sleeve.

The deformation of the invention of the bolt sleeve 1 to form a bellows shaped section is elastic or partially plastic.

Figure 2:
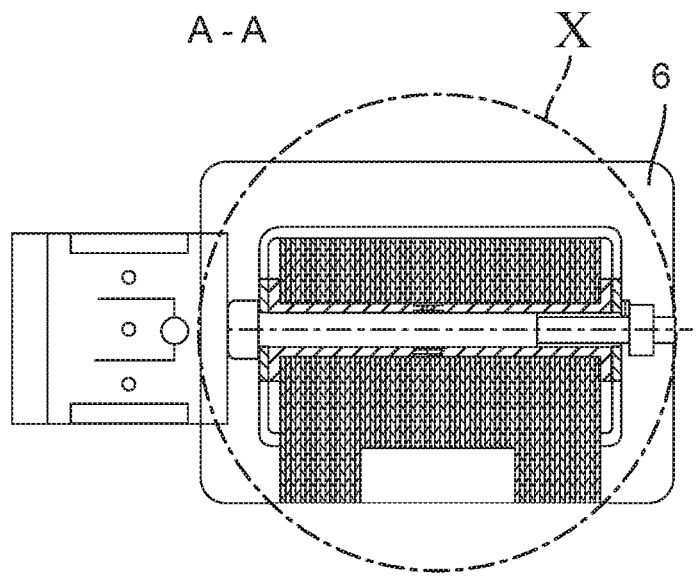
FIG. 2 are cross sections through a coil system of the invention for a magneto inductive flow measuring device of the invention.
Figure 2:
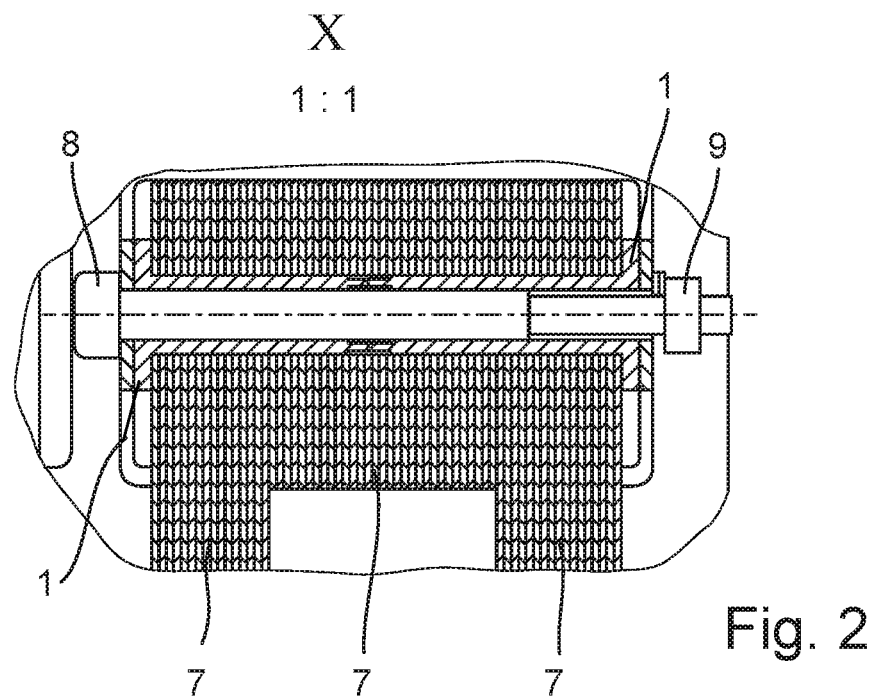

FIG. 2 shows a magneto inductive flow measuring device having a coil 6 and, led through the coil 6, core sheets 7, which are bolted together by means of at least one bolted connection. The bolts 8, in such case, are electrically and/or magnetically insulated from the core sheets 7 by means of the bolt sleeves 1 of the invention.

In the illustrated example, two bolt sleeves 1 arranged opposite one another are so prestressed relative to one another by means of the bolted connection, here formed of bolt 8 and nut 9, that at least one bolt sleeve 1 shortens axially by a predetermined amount, such that it at least partially assumes the shape of a bellows. For purposes of insulation, the bolt sleeves 1 prevent the core sheets 7 from contacting the bolts 8. In order to accommodate tolerances, for example, in the thicknesses of the core sheet stacks, the bolt sleeves 1 are, in such case, so embodied that the sum of their lengths in the unassembled state, which lie in the assembled state in the core sheet stacks, exceeds the thickness of the core sheet stack by a predetermined amount. The predetermined amount is, in such case, less than the greatest possible axial compression of the bolt sleeves 1, without that these are deformed beyond the parameters of the invention.

In the assembling, the bolt sleeves 1 are inserted from both sides into the core sheet stacks. Their annular tips contact one another in such case. If now a bolt 8 is inserted through the bolt sleeves 1 and the nut tightened, the bolt head introduces an axially acting force into the bolt sleeves 1, which leads to the fact that at least one of the bolt sleeves 1 is deformed according to the invention, until the bolt head comes to rest and the sum of the lengths of the bolt sleeves 1 in the core sheet stack corresponds to the thickness of the core sheet stacks.

Of course, this can also be achieved by other measures, for example, by non-conductive bolts or bolt sleeves with mutually engaging rings on their tips, wherein a first ring has an inner diameter, which is greater than or equal to the bolt guiding region of the bolt sleeve and has an outer diameter, which is less than that of the bolt guiding region of the bolt sleeve, wherein the second ring then has an inner diameter, which is greater than or equal to the outer diameter of the first ring and an outer diameter, which is less than or equal to that of the bolt guiding region of the bolt sleeve.

An advantage of the invention compared with these solutions is, however, that the bolt sleeve 1 is simple and cost effective to manufacture.

In a further development of the invention, the core sheets have equal shape and size, especially of a first leg, and predetermined bores, especially bores in the first leg, and are so arranged that the bores of a first core sheet coincide with the bores of a second core sheet in the mounted state of the coil system, so that the first and second core sheets can be bolted together through the bores, wherein the first core sheet and the second core sheet are led through the coil axially offset relative to one another or wherein the first core sheet and the second core sheet are led parallel and oppositely directed relative to one another through the coil, wherein the first leg of the first core sheet and the first leg of the second core sheet coincide. A first end of the first core sheet, here in the region of a second leg, is, thus, arranged alongside a second end of the second core sheet. Second legs of the core sheets are located then on different ends of the coil and point especially in the same direction.

In an additional further development of the invention, each core sheet has a first leg and a second leg, which are connected with one another to form an L shape, wherein at least a first core sheet and a second core sheet and a third core sheet are so led through the coil that the first leg of the first core sheet and the first leg of the second core sheet and the first leg of the third core sheet extend parallel to one another through the coil and that the second leg of the first core sheet and the second leg of the second core sheet and the second leg of the third core sheet extend parallel to one another, wherein the second leg of the first core sheet and the second leg of the third core sheet are arranged at a first end of the coil and the second leg of the second core sheet is arranged at a second end of the coil facing away from the first end, wherein the second core sheet is arranged between the first and the third core sheets, especially led centrally through the coil and wherein a pole shoe is arranged between a measuring tube and at least the second legs of the first and third core sheets. The first legs of the core sheets and the second legs of the first and a third core sheet and the second leg of the second core sheet form, in such case, especially a U shaped coil core. The bores in the core sheets are, thus, arranged symmetrically in the core sheets with reference to the length of the first legs.

Figure 3:
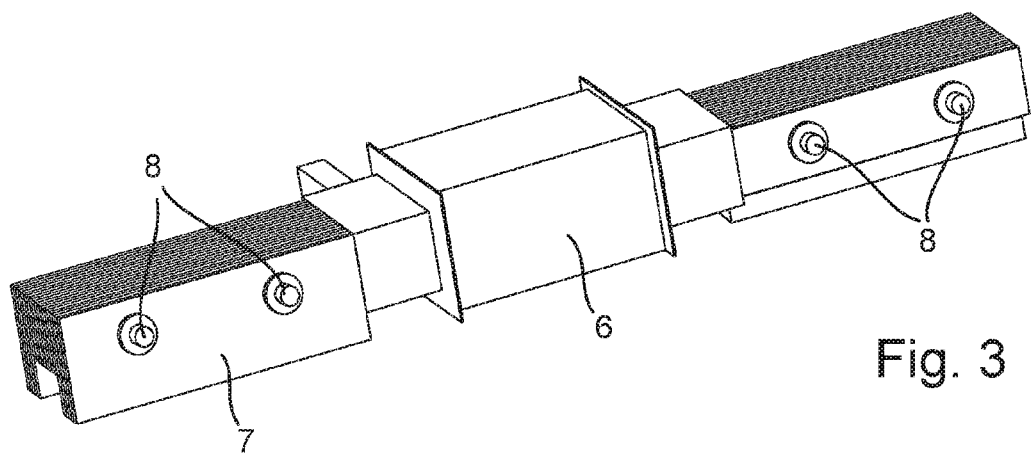
FIG. 3 shows perspectively, a coil system of the invention for a magneto inductive flow measuring device of the invention.

The coil system sectioned in FIG. 2 is shown perspectively in FIG. 3.

The invention claimed is:

1. A magneto inductive flow measuring device, comprising:
   a coil and core sheets led through said coil; and
   a bolt sleeve;
   wherein the core sheets are bolted together by means of a bolt, and the bolt is insulated from the core sheets by means of the bolt sleeve; and
   wherein the bolt sleeve is so embodied that the length of the bolt sleeve axially shortens by a predetermined amount in the case of a force of predetermined size acting axially on it, whereupon said bolt sleeve assumes at least partially the shape of a bellows.

2. The magneto inductive flow measuring device as claimed in claim 1, wherein:
   said bolt sleeve has a region with a lessened wall thickness, which, in the case of a force of predetermined size acting axially on said bolt sleeve, assumes the shape of a bellows and, thus, shortens axially by a predetermined amount.

3. The magneto inductive flow measuring device as claimed in claim 2, wherein:
   said region with the lessened wall thickness is located at the tip of said bolt sleeve; and
   said region has a greater inner diameter and a smaller outer diameter than said bolt sleeve in a region for guiding a bolt.

4. The magneto inductive flow measuring device as claimed in claim 2, wherein:
   the axial length of said region with the lessened wall thickness is small in comparison with the axial length of a region of the bolt sleeve for guiding a bolt.

5. The magneto inductive flow measuring device as claimed in claim 1, wherein:
   said bellows has a smaller outer diameter than the bolt sleeve in a region for guiding the bolt.

6. The magneto inductive flow measuring device as claimed in claim 1, wherein:
   the device includes two bolt sleeves surrounding the bolt facing each other with their tip, which are so prestressed relative to one another by means of the bolt that at least the length of one bolt sleeve axially shortens by a predetermined amount, whereupon the bolt sleeve assumes at least partially the shape of a bellows.

7. The magneto inductive flow measuring device as claimed in claim 1, wherein:
   said core sheets have at least a first leg of equal shape and size and predetermined bores in said first leg, which are so arranged that the bores of a first core sheet coincide with the bores of a second core sheet;
   said first core sheet and said second core sheet are led axially offset from one another through the coil, or
   said first core sheet and said second core sheet are led directed oppositely to one another through the coil; and
   the first leg of said first core sheet and the first leg of said second core sheet coincide.

8. The magneto inductive flow measuring device as claimed in claim 1, wherein:
   each core sheet has a first leg and a second leg, which are connected with one another to form an L shape;
   at least a first core sheet and a second core sheet and a third core sheet are so led through the coil that the first leg of said first core sheet and the first leg of said second core sheet and the first leg of said third core sheet extend parallel to one another through the coil and that the second leg of said first core sheet and the second leg of said second core sheet and the second leg of said third core sheet extend parallel to one another;
   the second leg of said first core sheet and the second leg of said third core sheet are arranged at a first end of the coil and the second leg of said second core sheet is arranged at a second end of the coil facing away from the first end; and
   the second core sheet is arranged between the first and the third core sheets and a pole shoe is arranged between a measuring tube and the second legs of the first and third core sheets.

* * * * *